(12) United States Patent
Liu

(10) Patent No.: US 11,074,146 B2
(45) Date of Patent: Jul. 27, 2021

(54) METHOD, DEVICE AND COMPUTER PROGRAM PRODUCT FOR MANAGING REDUNDANT ARRAYS OF INDEPENDENT DRIVES

(71) Applicant: EMC IP Holding Company LLC, Hopkinton, MA (US)

(72) Inventor: Bing Liu, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/794,455

(22) Filed: Feb. 19, 2020

(65) Prior Publication Data

US 2020/0409809 A1 Dec. 31, 2020

(30) Foreign Application Priority Data

Jun. 27, 2019 (CN) .......................... 201910569797.X

(51) Int. Cl.
*G06F 11/00* (2006.01)
*G06F 11/20* (2006.01)
*G06F 11/10* (2006.01)

(52) U.S. Cl.
CPC ...... *G06F 11/2094* (2013.01); *G06F 11/1088* (2013.01); *G06F 2201/805* (2013.01)

(58) Field of Classification Search
CPC ............ G06F 11/1076; G06F 11/1088; G06F 11/1092; G06F 11/2094
See application file for complete search history.

(56) References Cited

U.S. PATENT DOCUMENTS

| | | | | |
|---|---|---|---|---|
| 9,141,457 | B1* | 9/2015 | Ma ....................... | G06F 11/008 |
| 2007/0079170 | A1* | 4/2007 | Zimmer ................ | G06F 11/008 |
| | | | | 714/6.23 |
| 2012/0084600 | A1* | 4/2012 | Kidney ............... | G06F 11/1088 |
| | | | | 714/6.13 |
| 2014/0215147 | A1* | 7/2014 | Pan ..................... | G06F 11/1092 |
| | | | | 711/114 |
| 2015/0286531 | A1* | 10/2015 | Bondurant .......... | G06F 11/1088 |
| | | | | 714/6.23 |

OTHER PUBLICATIONS

Poulin, Ryan, Dell EMC Unity: Dynamic Pools, Nov. 2019, Dell EMC Technical White Paper (Year: 2019).*
Dell EMC Data Domain® Operating System, Administration Guide, Version 6.1 REV. 05, Feb. 2019 (556 pages).

* cited by examiner

*Primary Examiner* — Michael Maskulinski
(74) *Attorney, Agent, or Firm* — Chamberlain, Hrdlicka, White, Williams & Aughtry

(57) ABSTRACT

Embodiments of the present disclosure relate to method, device and computer program product for managing Redundant Arrays of Independent Drives (RAID). The method comprises obtaining a log parameter associated with a status of a drive extent in the RAID from log pages of the RAID. The method also comprises determining, based on the log parameter, a prediction of a failure of the drive extent within a predetermined time interval. Moreover, the method further comprises in response to a determination that the drive extent is expected to fail, determining a reconstruction sequence of the RAID for a reconstruction of the RAID, such that the drive extent expected to fail within the predetermined time interval has a higher reconstruction priority than other drive extents in the RAID.

20 Claims, 6 Drawing Sheets

METHOD, DEVICE AND COMPUTER PROGRAM PRODUCT FOR MANAGING REDUNDANT ARRAYS OF INDEPENDENT DRIVES

CROSS-REFERENCE TO RELATED APPLICATIONS

This application claims benefit to Chinese Patent Application 201910569797.X filed on Jun. 27, 2019. Chinese Patent Application 201910569797.X is hereby incorporated by reference in its entirety.

FIELD

Embodiments of the present disclosure generally relate to data storage, and more specifically, to method, device and computer program product for managing redundant arrays of independent drives.

BACKGROUND

Redundant Array of Independent Drive (RAID) is a data storage virtualization technique that combines multiple physical extents (PE) into a single logical unit for the purpose of data redundant backup and/or performance improvement. When a single drive fails, a subsequent read can be performed with distributed parity information to avoid data loss. Meanwhile, the spare drive will be chosen to replace the failed drive and all data on the failed drive may be rebuilt and written into the spare drive.

RAID reconstruction may greatly affect the system from the perspective of storage availability and performance. In particular, the reconstruction time will increase as the current drive capacity continues to grow. Therefore, the long reconstruction times brings risks to data loss, data unavailability and data corruption, which results into significant degradation of the RAID performance

SUMMARY

Embodiments of the present disclosure relate to method, device and computer program product for managing redundant arrays of independent drives.

In a first aspect of the embodiments of the present disclosure, there is provided a method for managing RAID. The method comprises obtaining a log parameter associated with a status of a drive extent in the RAID from log pages of the RAID. The method also comprises determining, based on the log parameter, a prediction of a failure of the drive extent within a predetermined time interval. Moreover, the method further comprises in response to a determination that the drive extent is expected to fail, determining a reconstruction sequence of the RAID for a reconstruction of the RAID, such that the drive extent expected to fail within the predetermined time interval has a higher reconstruction priority than other drive extents in the RAID.

In a second aspect of the embodiments of the present disclosure, there is provided a device for managing RAID. The device comprises at least one processor and at least one memory including computer program instructions. A memory coupled to the at least one processor, the memory having instructions stored therein, the instructions, when executed by the at least one processing unit, causing the device to execute acts. The acts comprising: obtaining a log parameter associated with a status of a drive extent in the RAID from log pages of the RAID. The acts also comprise determining, based on the log parameter, a prediction of a failure of the drive extent within a predetermined time interval. Moreover, the acts further comprise in response to a determination that the drive extent is expected to fail, determining a reconstruction sequence of the RAID for a reconstruction of the RAID, such that the drive extent expected to fail within the predetermined time interval has a higher reconstruction priority than other drive extents in the RAID.

In a third aspect of the present disclosure, there is provided a computer program product, which is tangibly stored on a non-transient computer readable medium and includes machine executable instructions, the machine executable instructions, when executed, causing a machine to execute the steps of the method of the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

In respective drawings, same or similar reference signs indicate same or similar elements.

DETAILED DESCRIPTION OF EMBODIMENTS

Various example embodiments of the present disclosure will be described below with reference to the accompanying drawings. It would be appreciated that these drawings and description are only provided as example embodiments. It should be pointed out that alternative embodiments of the structure and method disclosed herein are conceivable according to the following description, and these alternative embodiments may be used without departing from principles as claimed herein.

It is to be understood these example embodiments are discussed only for the purpose of enabling those skilled persons in the art to better understand and thus implement the present disclosure, rather than suggesting any limitations on the scope of the present disclosure.

As used herein, the term "includes", "comprises" and its variants are to be read as open-ended terms that mean "includes/comprises, but is not limited to." The term "based on" is to be read as "based at least in part on." The term "some example embodiments" is to be read as "at least some example embodiments"; and the term "another embodiment" is to be read as "at least one another embodiment". Relevant definitions of other terms may be included below.

Figure 1:
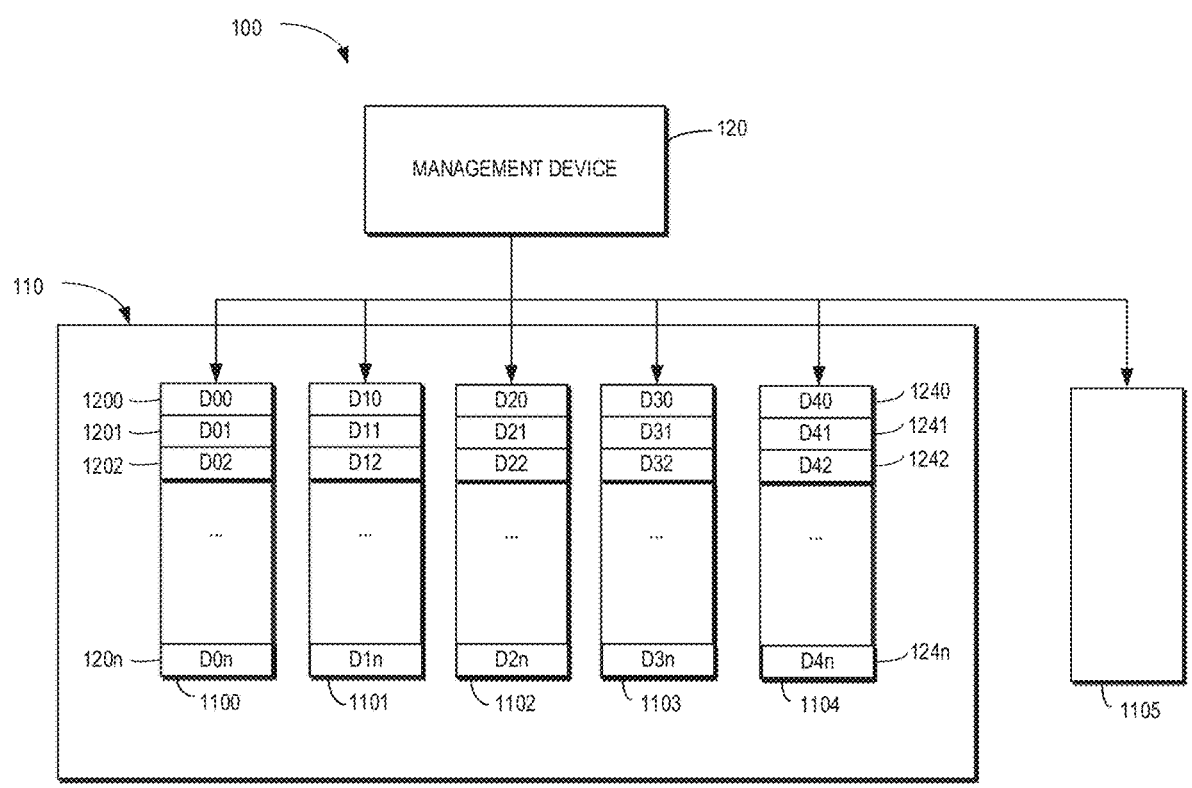
FIG. 1 illustrates a schematic diagram of an example operating environment 100 in which embodiments of the present disclosure can be implemented.

FIG. 1 illustrates a schematic diagram of an example operating environment 100 in which embodiments of the present disclosure can be implemented. The operating environment 100 includes a RAID group 110. In FIG. 1, the RAID group 110 implements RAID 5 (4D+1P) and thus has 4 data blocks and 1 parity block. The RAID group 110 contains drives $110_0$, $110_1$, $110_2$, $110_3$ and $110_4$, where drives $110_0$, $110_1$, $110_2$ and $110_3$ are data drives while the drive $110_4$ is a parity drive. The RAID group 110 takes a drive $110_5$ as a spare drive. When a certain drive or a certain drive block in the RAID group 110 fails, the spare drive is used to reconstruct the drive or the drive block. Each stripe of the RAID group 110 can include 5 blocks composed of 4 data blocks (i.e., data block D00, D01 D03$n$) and 1 parity block (i.e., parity block D40, D42 D4$n$).

In addition, the operating environment 100 also can include a management device 120 for managing the RAID group 110. In the embodiments of the present disclosure, the management device 120, for example, can execute read/write operations, failure prediction and reconstruction operations on drives of the RAID group 110.

As described above, being a virtualized technology for data storage, Redundant Array of Independent Drive (RAID) combines a plurality of physical drives into a single logic unit for the purpose of data redundancy backup and/or performance improvement. When a single drive fails, subsequent read can be performed through distributed parity information to avoid data loss. Meanwhile, the spare drive will be chosen to replace the failed drive and all data on the failed drive may be rebuilt and written into the spare drive.

RAID reconstruction would greatly affect the system from the perspective of storage availability and performance. In particular, the reconstruction time will prominently increase as the current drive capacity continues to grow. Therefore, the long reconstruction times brings risks to data loss, data unavailability and data corruption, which results into significant degradation of the RAID performance.

Hence, the present disclosure introduces a reconstruction method known as "copy reconstruction." When the management device 120 detects that SMART errors exceeds a threshold, the management device 120 finds the spare drive $110_5$ and tries to sequentially copy the data in a defective working drive to the spare drive $110_5$. Once the Input/Output (I/O) error or timeout occurs, the reconstruction logic is changed from the copy logic into RAID parity computation (with data of other normally working drives). The parity computation can continue to work for the drive extents of the data and then try to return to the copy operation again.

Such reconstruction method is not aware of failure status of each drive extent of the underlying drives and would cause the following defects. For example, more I/O errors are generated from accessing drive extents of the defective drives and these errors further result into more serious risks to data loss and the like, thereby adversely affecting the system.

Moreover, accessing drive extents of the defective drives results into higher I/O errors. The I/O requests include not only reconstruction requests, but also other I/O requests during the reconstruction procedure. High latency resulted from the I/O requests severely degrades customer experience.

Furthermore, the reconstruction logic of the current solution does not focus on potential health status of the drive extents. Accordingly, the most vulnerable data (on dying drive extents) cannot be given the highest priority during the long reconstruction time operations, which further increases risks to data loss, data unavailability and data corruption etc.

Therefore, embodiments of the present disclosure provide a method for managing RAID. The management device 120 can predict, based on the log parameter of a drive extent in the RAID group, the drive extent which is expected to fail within a predetermined time interval and give priority to reconstructing this drive extent during the reconstruction procedure. Meanwhile, the drive extent which is expected to fail within a predetermined time interval should not be accessed during the reconstruction procedure. In this way, the influence of the reconstruction procedure on the system performance is minimized, the risks to data loss are lowered and the system degradation is avoided.

The term "drive extent" here is also referred to as physical drive extent, which can involve one or more drive blocks on the drives of the RAID group. The size of the drive extent can be defined according to the requirements of the users. In the embodiments of the present disclosure, the term "drive extent" indicates a minimum unit on which failure prediction can be performed in the drives of the RAID group.

Figure 2:
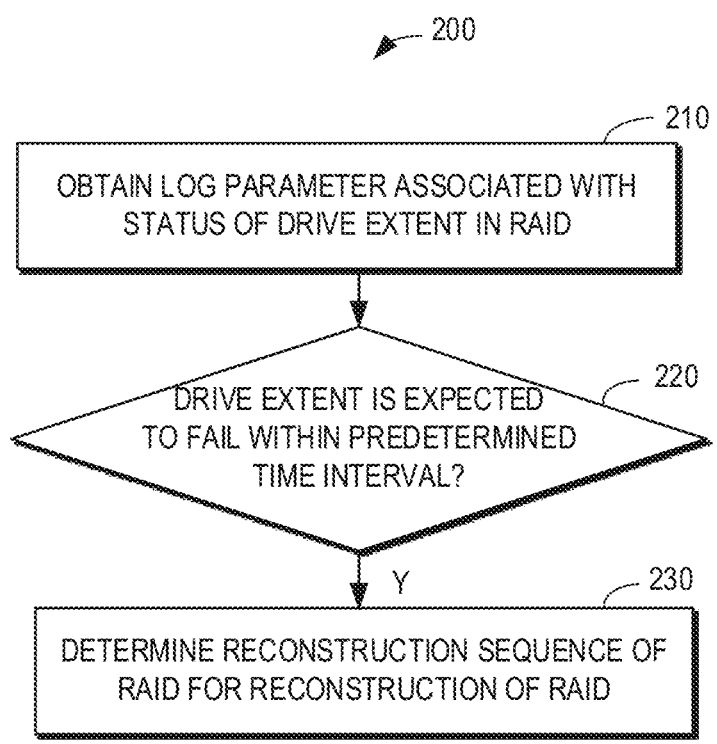
FIG. 2 illustrates a flowchart of the method 200 for managing the RAID in accordance with embodiments of the present disclosure.

The method in accordance with embodiments of the present disclosure is further described in details below with reference to FIGS. 2 to 5. FIG. 2 illustrates a flowchart of the method 200 in accordance with embodiments of the present disclosure. For the ease of description, FIG. 2 uses the reference signs consistent with FIG. 1 for same or similar components.

At block 210, the management device 120 obtains, from log pages of the RAID, the log parameter associated with status of drive extent in the RAID.

In some embodiments, Background Media Scan (BMS) is a background scan mechanism within a drive frame. With no instructions arriving within a time window, the drive frame starts a scan read process. When a scan read request fails, the drive frame, with Cyclic Redundancy Check (CRC) code, tries to recover the data and rewrites it into the defective Logical Block Address (LBA). If the recovery fails, the unrecovered counter increases.

Figure 3:
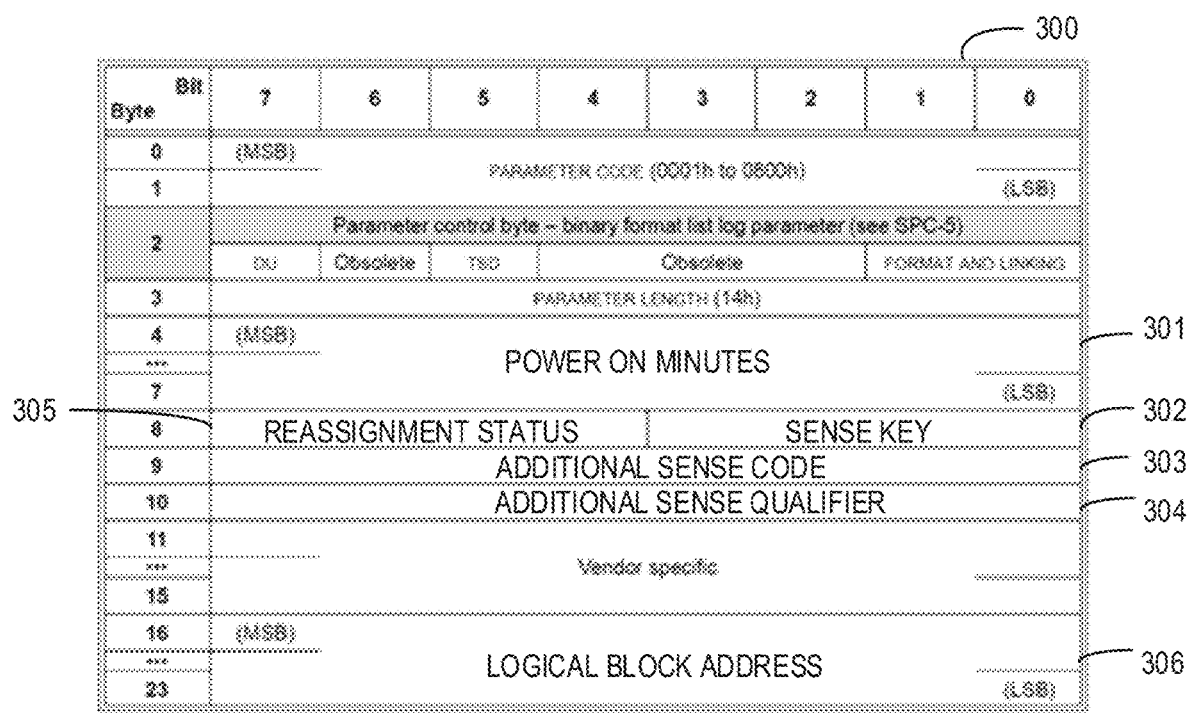
FIG. 3 illustrates a schematic diagram of a log page in accordance with embodiments of the present disclosure.

The drive monitor can collect the scan and parity results by log pages. FIG. 3 illustrates a schematic diagram of a log page in accordance with embodiments of the present disclosure. An instance of standard BMS result log parameter is demonstrated in FIG. 3.

In some embodiments, the log parameter associated with status of drive extent in the RAID and obtained by the management device 120 from the log pages of the RAID, for example, can include one or more of sense keyword 302, additional sense code 303, additional sense qualifier 304, power on minutes 301, reassignment status 305 and LBA 306 associated with the drive extent that failed during the read background scan.

Referring to FIG. 2 again, at block 220, the management device 120 determines, based on the obtained log parameter, whether a corresponding drive extent is expected to fail within a predetermined time interval.

In some embodiments, the management device 120 can obtain an association between status of a drive extent and a probability of an expected failure of the drive extent within a predetermined time interval. The association, for example, can be a machine learning model associated with failure prediction, such as random forest model.

The obtained log parameter, for example, one or more of sense keyword 302, additional sense code 303, additional sense qualifier 304, power on minutes 301, reassignment status 305 and LBA 306 associated with the drive extent that failed during the read background scan, can be used as features to determine an association between the status of a drive extent and a probability of an expected failure of the drive extent within a predetermined time interval while the number of unrecovered errors acts as response data and the random forest model is a training method for the machine-learning model.

In some embodiments, the management device 120 can determine a probability of the failure in the drive extent based on the obtained the log parameter and the association between the status of the determined drive extent and the probability of an expected failure of determined drive extent within a predetermined time interval. Once the probability of failure exceeds a threshold probability, it is determined that the drive extent is dying.

At block 230, if the management device 120 determines that the drive extent is expected to fail, the management device 120 determines a reconstruction sequence of the RAID for reconstructing the RAID. The reconstruction sequence can enable the drive extent that is expected to fail within a predetermined time interval to have a higher reconstruction priority over other drive extent in the RAID, i.e., the drive extent which is not expected to fail.

Figure 4:
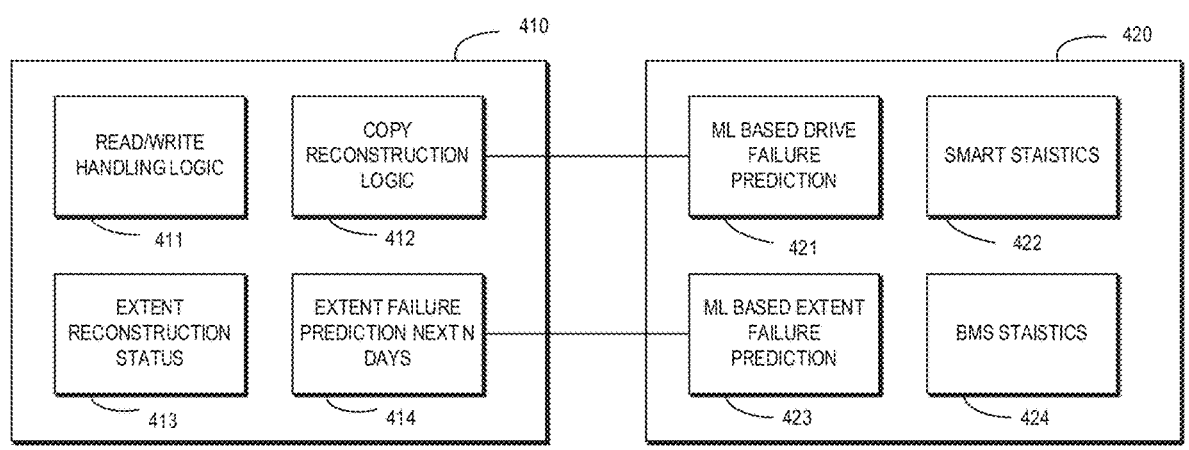
FIG. 4 illustrates a schematic diagram of executing failure prediction on the drive extents and reconstructing exemplary components in accordance with embodiments of the present disclosure.

FIG. 4 illustrates a schematic diagram of executing failure prediction on the drive extent and reconstructing exemplary components in accordance with embodiments of the present disclosure. Acts shown in the flowchart 200 of FIG. 2 are further described below with reference to FIG. 4.

As shown, executing failure prediction on the drive extent and reconstructing exemplary components can include RAID background logic module group 410 and failure prediction module 420, which for example can be composites of the management device 120 shown in FIG. 1.

A machine-learning-based drive failure prediction module 421 in the failure prediction module 420 monitors data of SMART statistics module 422 and BMS statistics module 423 and then predicts failure within a predetermined time interval (e.g., N days) on the entire drive level. If the machine-learning-based drive failure prediction module 421 predicts a dying drive, a copy reconstruction procedure of a copy reconstruction logic module 412 in the RAID background logic module group 410 will be proactively triggered. The copy reconstruction logic module 412 finds a spare drive and performs reconstruction via copy or RAID parity check.

A machine-learning-based drive extent failure prediction module 423 in the failure prediction module 420 predicts failure on the drive extent level within a following predetermined time interval (e.g., N days) using the data of the BMS statistics module 423 and informs a drive extent failure prediction module 414. If the failure on the drive extent level within a predetermined time interval is predicted, the copy reconstruction procedure of the copy reconstruction logic module 412 in the RAID background logic module group 410 will be proactively triggered.

In some embodiments, the management device 120 can generate a bitmap for reconstructing the RAID. The bitmap can indicate a drive extent which is predicted to fail within a predetermined time interval. The bitmap may alternatively track that drive extent which are not predicted to fail within a predetermined time interval. The management device 120 can reconstruct the RAID based on the generated bitmap.

For example, the management device 120 can first reconstruct the drive extent which is expected to fail within the predetermined time interval as indicated in the bitmap. It is possible that more than one drive extent is expected to fail within the predetermined time interval. Every time the reconstruction of one drive extent is completed, the management device 120 updates the bitmap until the reconstruction of the last extent drive which is predicted to fail within the predetermined time interval as indicated in the bitmap is completed. Then, the copy reconstruction starts for the drive extent not predicted to fail within the predetermined time interval.

Accordingly, the original reconstruction logic can be optimized through the failure prediction result, so as to reconstruct the most vulnerable data on the drive extent which is expected to fail at a high priority and avoid severe degradation of the system.

Thus, the copy reconstruction logic module 412 is triggered when a defective drive is detected. If the working drive does not go offline, the copy reconstruction procedure will be initiated on the spare drive. Based on the drive extent-level failure prediction, the drive extent expected to fail is reconstructed through copy or RAID parity computation. Meanwhile, reconstruction still requires considering processing of normal read/write requests of a write request processing logic module 411.

Figure 5:
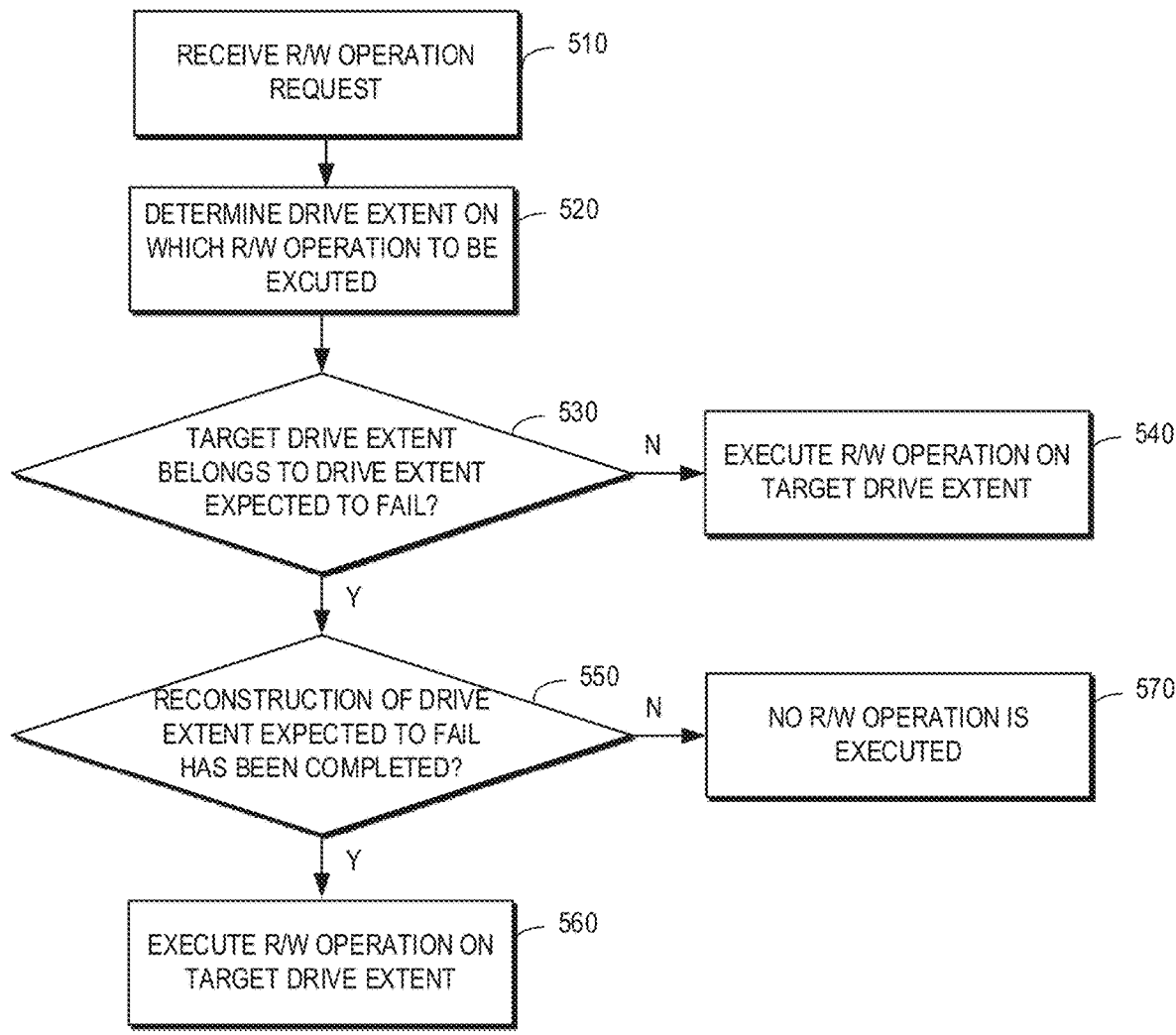
FIG. 5 illustrates a flowchart of a method 500 for processing read/write operations during the RAID reconstruction in accordance with embodiments of the present disclosure.

FIG. 5 illustrates a flowchart of a method 500 for processing read/write operations during the RAID reconstruction in accordance with embodiments of the present disclosure. The method for processing read/write requests during the reconstruction procedure is further described below with reference to FIG. 5.

At block 510, the management device 120 receives a new read/write request during the reconstruction procedure. At block 520, the management device 120 can determine a target drive extent on which the read/write operation is to be executed according to length and offset indicated by the read/write request.

At block 530, the management device 120 determines whether the target drive extent on which the read/write operation is to be executed belongs to the drive extent expected to fail. If the management device 120 determines that the target drive extent on which the read/write operation is to be executed does not belong to the drive extent expected to fail, the management device 120 executes the read/write operation on the target drive extent at block 540.

In some embodiments, if the management device 120 determines that the target drive extent on which the read/write operation is to be executed belongs to the drive extent expected to fail, the management device 120 determines whether the reconstruction of the drive extent expected to fail is completed at block 550. If the reconstruction has been completed, the management device 120 executes the read/write operation on the target drive extent at block 560.

In some embodiments, if the management device 120 determines that the reconstruction of the drive extent expected to fail is not completed, the management 120 does not execute the write operation at block 570.

In some embodiments, if the management device 120 determines that the reconstruction of the drive extent expected to fail is not completed, the management device 120 can determine whether a read operation or a write operation is requested. For the read operation, the management device 120 can try to return the data from other drives in the RAID through read and parity computation. For write operation, the management device 120 skips the drive extent which is expected to fail and whose reconstruction is not completed.

The method for processing requests in the reconstruction procedure as described above can avoid accesses to the drive extent expected to fail and thus reduce the influence on the operating system to a maximum degree.

Furthermore, as described above, in some embodiments, the management device 120 can reconstruct the RAID through the following manners. The management device 120 can leverage data of at least one drive extent associated with the drive extent expected to fail to recover the drive extent expected to fail on the spare drive. Afterwards, if the drive extent expected to fail is recovered, the management device 120 can copy the data of other drive extent in the RAID to the spare drive.

Through monitoring the Background Media Scan (BMS) statistics and the machine-learning algorithm, a physical drive extent level failure prediction can be executed. A drive can be divided into hundreds of physical drive extent and storage thus can be managed in a fine-grained way. Based on the physical drive level failure prediction, it can be clearly determined which drive extent on the drive is severely degraded within the predetermined time interval.

In this way, potential health risks to the drive extent can be determined. Hence, the most vulnerable data (in dying drive extent) can be listed at the highest priority during the reconstruction, which lowers the risks to data loss, data unavailability and data corruption etc. and further avoids higher I/O errors resulted from accessing the defective drive extent.

Figure 6:
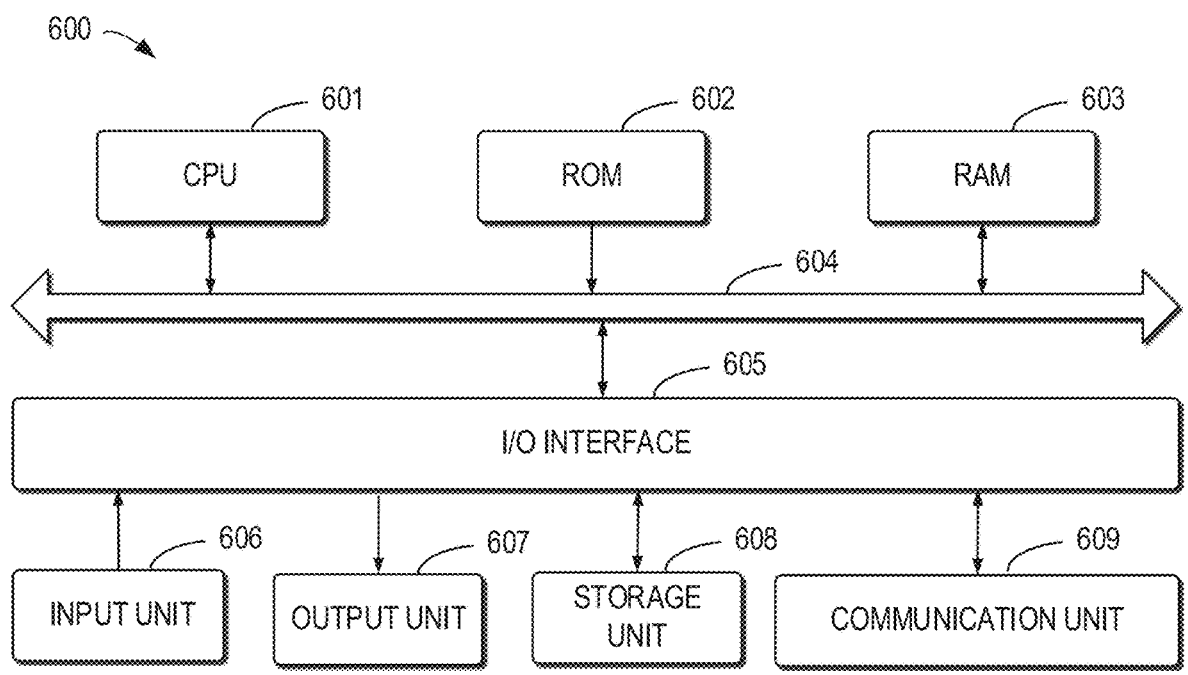
FIG. 6 illustrates a schematic block diagram of an example device 600 for implementing embodiments of the present disclosure.

FIG. 6 is a schematic block diagram illustrating an example device 600 that can be used to implement embodiments of the present disclosure. For example, the management device 120 as shown in FIG. 1 can be implemented by the device 600. As shown, the device 600 includes a central processing unit (CPU) 601 that may perform various appropriate acts and processing based on computer program instructions stored in a read-only memory (ROM) 602 or computer program instructions loaded from a storage unit 604 to a random access memory (RAM) 603. In the RAM 603, there further store various programs and data needed for operations of the device 600. The CPU 601, ROM 602 and RAM 603 are connected to each other via a bus 604. An input/output (I/O) interface 605 is also connected to the bus 604.

The following components in the device 600 are connected to the I/O interface 605: an input unit 606, such as a keyboard, a mouse and the like; an output unit 607, such as various kinds of displays and a loudspeaker, etc.; a storage unit 608, such as a magnetic disk, an optical disk, and etc.; a communication unit 609, such as a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the methods 300 and 400, can be executed by the processing unit 601. For example, in some embodiments, the methods 300 and 400 can be implemented as a computer software program that is tangibly embodied on a machine readable medium, e.g., the storage unit 604. In some embodiments, part or all of the computer programs can be loaded and/or mounted onto the device 600 via ROM 602 and/or communication unit 609. When the computer program is loaded to the RAM 603 and executed by the CPU 601, one or more steps of the methods 300 and 400 as described above may be executed.

The present disclosure is directed to a method, a device, a system and/or a computer program product. The computer program product may include a computer readable storage medium on which computer readable program instructions are carried out for performing each aspect of the present application.

The computer readable medium may be a tangible medium that may contain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. More specific examples (a non-exhaustive list) of the machine readable storage medium would include a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, device (system), and computer program products according to embodiments of the disclosure. It would be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams can represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments of the present disclosure. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

I claim:

1. A method for managing a Redundant Array of Independent Drives (RAID), comprising:
    obtaining a log parameter associated with a status of a drive extent in the RAID from log pages of the RAID;
    determining, based on the log parameter, that the drive extent is predicted to fail within a predetermined time interval;
    in response to a determination that the drive extent is predicted to fail, determining a reconstruction sequence of the RAID for a reconstruction of the RAID, such that the drive extent predicted to fail within the predetermined time interval has a higher reconstruction priority than other drive extents in the RAID; and
    initiating reconstruction of the RAID using the reconstruction sequence.

2. The method of claim 1, wherein obtaining the log parameter comprises obtaining at least one of following:
    a sense key,
    an additional sense code,
    an additional sense qualifier,
    a power on minutes,
    a reassignment status, and
    a Logical Block Address (LBA) associated with the drive extent that failed during a read background scan.

3. The method of claim 1, wherein determining that the drive extent is predicted to fail comprises:
    determining a probability of a failure of the drive extent based on the log parameter; and
    in response to a determination that the probability exceeds a threshold probability, determining that the drive extent is predicted to fail.

4. The method of claim 1, further comprising:
    in response to receiving an instruction of a read/write operation for the RAID during the reconstruction, determining a target drive extent on which the read/write operation is to be executed;
    determining whether the target drive extent belongs to the drive extent predicted to fail; and
    in response to a determination that the target drive extent does not belong to the drive extent predicted to fail, executing the read/write operation on the target drive extent.

5. The method of claim 1, further comprising:
    in response to receiving an instruction of a read/write operation for the RAID during the reconstruction, determining a target drive extent on which the read/write operation is to be executed;
    determining whether the target drive extent belongs to the drive extent predicted to fail;
    in response to a determination that the target drive extent belongs to the drive extent predicted to fail, determining whether the reconstruction of the drive extent predicted to fail has been completed; and
    in response to the completion of the reconstruction, executing the read/write operation on the target drive extent.

6. The method of claim 1, wherein reconstructing the RAID includes:
    generating a bitmap for reconstructing the RAID, the bitmap indicating the drive extent predicted to fail within the predetermined time interval; and
    reconstructing the RAID based on the bitmap.

7. The method of claim 1, further comprising:
reconstructing the RAID by:
- recovering the drive extent predicted to fail on a spare drive by using data of at least one drive extent associated with the drive extent predicted to fail; and
- in response to a recovery of the drive extent predicted to fail, replicating data of other drive extent in the RAID to the spare drive.

8. A device for managing a Redundant Array of Independent Drives (RAID), comprising:
at least one processor; and
a memory coupled to the at least one processor, the memory having instructions stored therein, the instructions, when executed by the at least one processing unit, causing the device to execute a method, the method comprising:
obtaining a log parameter associated with a status of a drive extent in the RAID from log pages of the RAID;
determining, based on the log parameter, that the drive extent is predicted to fail within a predetermined time interval;
in response to a determination that the drive extent is predicted to fail, determining a reconstruction sequence of the RAID for a reconstruction of the RAID, such that the drive extent predicted to fail within the predetermined time interval has a higher reconstruction priority than other drive extents in the RAID; and
initiating reconstruction of the RAID using the reconstruction sequence.

9. The device of claim 8, wherein obtaining the log parameter comprises obtaining at least one of following:
a sense key,
an additional sense code,
an additional sense qualifier,
a power on minutes,
a reassignment status, and
a Logical Block Address (LBA) associated with the drive extent that failed during a read background scan.

10. The device of claim 8, wherein determining that the drive extent is predicted to fail comprises:
determining a probability of a failure of the drive extent based on the log parameter; and
in response to a determination that the probability exceeds a threshold probability, determining that the drive extent is predicted to fail.

11. The device of claim 8, wherein the method further comprises:
in response to receiving an instruction of a read/write operation for the RAID during the reconstruction, determining a target drive extent on which the read/write operation is to be executed;
determining whether the target drive extent belongs to the drive extent predicted to fail; and
in response to a determination that the target drive extent does not belong to the drive extent predicted to fail, executing the read/write operation on the target drive extent.

12. The device of claim 8, wherein the method further comprises:
in response to receiving an instruction of a read/write operation for the RAID during the reconstruction, determining a target drive extent on which the read/write operation is to be executed;
determining whether the target drive extent belongs to the drive extent predicted to fail;
in response to a determination that the target drive extent belongs to the drive extent predicted to fail, determining whether the reconstruction of the drive extent predicted to fail has been completed; and
in response to the completion of the reconstruction, executing the read/write operation on the target drive extent.

13. The device of claim 8, wherein reconstructing the RAID includes:
generating a bitmap for reconstructing the RAID, the bitmap indicating the drive extent predicted to fail within the predetermined time interval; and
reconstructing the RAID based on the bitmap.

14. The device of claim 8, further comprising:
reconstructing the RAID by:
- recovering the drive extent predicted to fail on a spare drive by using data of at least one drive extent associated with the drive extent predicted to fail; and
- in response to a recovery of the drive extent predicted to fail, replicating data of other drive extent in the RAID to the spare drive.

15. A computer program product, which is tangibly stored on a non-transient computer readable medium and includes machine executable instructions, the machine executable instructions, when executed, causing a machine to perform a method, the method comprising:
obtaining a log parameter associated with a status of a drive extent in a Redundant Array of Independent Drives (RAID) from log pages of the RAID;
determining, based on the log parameter, that the drive extent is predicted to fail within a predetermined time interval;
in response to a determination that the drive extent is predicted to fail, determining a reconstruction sequence of the RAID for a reconstruction of the RAID, such that the drive extent predicted to fail within the predetermined time interval has a higher reconstruction priority than other drive extents in the RAID; and
initiating reconstruction of the RAID using the reconstruction sequence.

16. The computer program product of claim 15, wherein determining that the drive extent is predicted to fail comprises:
determining a probability of a failure of the drive extent based on the log parameter; and
in response to a determination that the probability exceeds a threshold probability, determining that the drive extent is predicted to fail.

17. The computer program product of claim 15, wherein the method further comprises:
in response to receiving an instruction of a read/write operation for the RAID during the reconstruction, determining a target drive extent on which the read/write operation is to be executed;
determining whether the target drive extent belongs to the drive extent predicted to fail; and
in response to a determination that the target drive extent does not belong to the drive extent predicted to fail, executing the read/write operation on the target drive extent.

18. The computer program product of claim 15, wherein the method further comprises:
in response to receiving an instruction of a read/write operation for the RAID during the reconstruction, determining a target drive extent on which the read/write operation is to be executed;
determining whether the target drive extent belongs to the drive extent predicted to fail;

in response to a determination that the target drive extent belongs to the drive extent predicted to fail, determining whether the reconstruction of the drive extent predicted to fail has been completed; and in response to the completion of the reconstruction, executing the read/write operation on the target drive extent.

19. The computer program product of claim 15, wherein reconstructing the RAID includes:

generating a bitmap for reconstructing the RAID, the bitmap indicating the drive extent predicted to fail within the predetermined time interval; and reconstructing the RAID based on the bitmap.

20. The computer program product of claim 15, wherein the method further comprise:

reconstructing the RAID by:

recovering the drive extent predicted to fail on a spare drive by using data of at least one drive extent associated with the drive extent predicted to fail; and in response to a recovery of the drive extent predicted to fail, replicating data of other drive extent in the RAID to the spare drive.

\* \* \* \* \*